US008241181B2

(12) United States Patent
Moriya et al.

(10) Patent No.: US 8,241,181 B2
(45) Date of Patent: Aug. 14, 2012

(54) CONTROL DEVICE AND CONTROL METHOD FOR VEHICLE

(75) Inventors: Naoto Moriya, Toyota (JP); Masaharu Tanaka, Toyota (JP); Masami Kondo, Toyota (JP); Hiroyasu Honda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 776 days.

(21) Appl. No.: 12/305,064

(22) PCT Filed: Jun. 6, 2007

(86) PCT No.: PCT/IB2007/001490
§ 371 (c)(1),
(2), (4) Date: Dec. 16, 2008

(87) PCT Pub. No.: WO2008/001170
PCT Pub. Date: Jan. 3, 2008

(65) Prior Publication Data

US 2009/0181823 A1 Jul. 16, 2009

(30) Foreign Application Priority Data

Jun. 26, 2006 (JP) ................................ 2006-175163

(51) Int. Cl.
*B60W 10/06* (2006.01)

(52) U.S. Cl. ............... 477/111; 477/98; 701/61; 701/56

(58) Field of Classification Search ........................ None
See application file for complete search history.

(56) References Cited

U.S. PATENT DOCUMENTS

| | | | | |
|---|---|---|---|---|
| 5,072,631 A | | 12/1991 | Fujimoto et al. | |
| 6,379,280 B1 * | | 4/2002 | Ogawa et al. | 477/107 |
| 6,574,541 B2 * | | 6/2003 | Katakura et al. | 477/111 |
| 7,052,434 B2 * | | 5/2006 | Makino et al. | 477/107 |
| 2002/0098944 A1 | | 7/2002 | Iriyama | |

(Continued)

FOREIGN PATENT DOCUMENTS

DE 103 61 370 3/2005

(Continued)

OTHER PUBLICATIONS

Notification of Reason(s) for Refusal for KR 2008-7023862 dated Aug. 12, 2010.

(Continued)

*Primary Examiner* — David D Le
*Assistant Examiner* — Jacob S Scott
(74) *Attorney, Agent, or Firm* — Finnegan, Henderson, Farabow, Garrett & Dunner, LLP

(57) ABSTRACT

An ECU executes a program including the steps of: setting a first throttle opening degree (S100), setting a low gear torque LTE based on an engine torque map for low gear having the first throttle opening degree and an engine speed (rpm) as parameters (S200), setting a high gear torque HTE based on an engine torque map for high gear having the first throttle opening degree and the engine speed as parameters (S300), setting a target engine torque TTE by combining the low gear torque LTE and the high gear torque HTE by using a correction ratio KGR determined by a gear step (S400), and controlling the engine to produce a required torque set by using the target engine torque TTE (S700). In this way a torque can be obtained in accordance with the engine speed.

19 Claims, 10 Drawing Sheets

U.S. PATENT DOCUMENTS

| | | | | |
|---|---|---|---|---|
| 2005/0023058 | A1 | 2/2005 | Gebby et al. | |
| 2005/0065691 | A1* | 3/2005 | Cho | 701/54 |
| 2007/0179016 | A1* | 8/2007 | Honda et al. | 477/97 |
| 2007/0254772 | A1* | 11/2007 | Satou et al. | 477/107 |

FOREIGN PATENT DOCUMENTS

| | | |
|---|---|---|
| EP | 1 394 396 A2 | 3/2004 |
| JP | 6-088541 | 3/1994 |
| JP | 8-128344 | 5/1996 |
| JP | 11-091410 | 4/1999 |
| JP | 2002-195087 | 7/2002 |
| JP | 2004-162574 | 6/2004 |

OTHER PUBLICATIONS

Office Action for German Patent Application No. 11 2007 000 963.2 dated Feb. 1, 2012.

* cited by examiner

CONTROL DEVICE AND CONTROL METHOD FOR VEHICLE

CROSS-REFERENCE TO RELATED APPLICATIONS

This application is a national phase application of International Application No. PCT/IB2007/001490, filed Jun. 6, 2007, and claims the priority of Japanese Application No. 2006-175163, filed Jun. 26, 2006, the contents of both of which are incorporated herein by reference.

BACKGROUND OF THE INVENTION

1. Field of the Invention

The present invention relates to a control device and a control method for a vehicle; and, more particularly, to a technology for controlling a vehicle to output torque, determined in accordance with a rotational speed (rpm) of the output shaft of a power source.

2. Background of the Invention

Conventionally, a vehicle having an electronic throttle valve driven by a motor are known. The opening degree of the electronic throttle valve, i.e. the throttle opening degree, is controlled in accordance with the operation amount of an accelerator. In such a vehicle having the electronic throttle valve, there has been proposed an engine control technology wherein a target torque of an engine is set based on the accelerator operation amount and the throttle opening degree is then set in accordance with the target torque to thereby control the engine.

Japanese Patent Application Publication No. 2002-195087 (JP-A-2002-195087) describes an engine control device for a vehicle, which controls the output of an engine by setting a target engine torque and then controlling a throttle valve on the basis of the target engine torque. The engine control device includes a calculation part for calculating a correction quantity for a target engine torque through a surface-interpolation in which, by using a map having a transmission ratio and an engine speed (rpm) as lattice axes, the interpolation is performed in the directions of the transmission ratio and the engine speed; and a correction part correcting the target engine torque based on the correction quantity.

In accordance with the engine control unit described in JP-A-2002-195087, the throttle opening degree is controlled by calculating a correction quantity for the target engine torque by using the surface-interpolation map having the transmission ratio and the engine speed as the lattice axes and correcting the target engine torque based on the correction quantity. Accordingly, a desired engine torque depending on an increase of the engine rotational speed can be obtained at any transmission position.

However, in the engine control unit described in JP-A-2002-195087, wherein the target engine torque is to be corrected, the corrected target engine torque may be insufficient if the target engine torque is small. In this case, it is difficult to know whether the corrected target engine torque, i.e. the actual torque output, is really being varied depending on the engine speed.

SUMMARY OF THE INVENTION

The present invention provides a control device and a control method for a vehicle capable of obtaining a torque depending on the rotational speed (rpm) of an output shaft of a power source.

In accordance with a first aspect of the present invention, there is provided a control device for a vehicle including a power source and a transmission connected to the power source, the control device including: a first setting unit that sets a first torque, determined in accordance with a rotational speed (rpm) of an output shaft of the power source; a second setting unit for setting a second torque determined in accordance with the rotational speed of the output shaft of the power source in a different manner from the first setting unit; a third setting unit that sets a third torque by combining the first torque and the second torque at a ratio depending on the gear ratio of the transmission; and a control unit that controls the power source to output a torque determined in accordance with the third torque.

In the first aspect of the present invention, the first torque is set by the first setting unit in accordance with the rotational speed of the output shaft of the power source and the second torque is set by the second setting means in accordance with the rotational speed of the output shaft of the power source in a manner that differs from that in the first setting unit. The third torque is set by combining the first and the second torque at a ratio determined in accordance with the gear ratio of the transmission. In this way, it is possible to obtain a third torque that varies according to the rotational speed of the output shaft of the power source in a characteristic manner for each transmission ratio. The power source is controlled to output a torque determined in accordance with the third torque. Accordingly, the actual torque output from the power source changes depending on the rotational speed of the output shaft. As a result, with the control device for a vehicle, it is possible to obtain a torque determined in accordance with the rotational speed of the output shaft of the power source.

In accordance with a second aspect of the present invention, in the control device of the first aspect, the second setting unit sets the second torque to be greater than the first torque.

In the second aspect of the present invention, the third torque is set by combining the first torque and the second torque, which is set larger than the first torque, at a ratio determined in accordance with the gear ratio of the transmission. Accordingly, third torques of various magnitudes are obtained, so that an optimum third torque may be set for each transmission ratio of the transmission.

In accordance with a third aspect of the present invention, in the control device of the first or the second aspect, the third setting unit sets the third torque by combining the first torque and the second torque at a ratio that further depends on a traveling environment of the vehicle as well as the transmission ratio.

In the third aspect of the present invention, the third torque is set by combining the first torque and the second torque at a ratio determined in accordance with the traveling environment of the vehicle as well as the gear ratio of the transmission. For example, the first and second torques are combined at a ratio determined on the basis of at least one of a temperature of the intake air into the power source (intake air temperature) and the atmospheric pressure, as well as the transmission ratio. Accordingly, the third torque is set by taking the intake air temperature and the atmospheric, pressure both of which are factors influencing the efficiency of the power source, into consideration. Therefore, if the intake air temperature and/or the atmospheric pressure change, the variation of the actual torque output from the power source is reduced.

In accordance with a fourth aspect of the present invention, in the control unit of the third aspect, the traveling environment of the vehicle is at least one of a temperature of an intake air into the power source and an atmospheric pressure.

In the fourth aspect of the present invention, the first torque and the second torque are combined at a ratio determined on the basis of at least one of the temperature of the intake air into the power source (intake air temperature) and the atmospheric pressure as well as the transmission ratio of the transmission. Accordingly, the third torque is set by taking the intake air temperature and the atmospheric pressure, both of which are the factors that influence the efficiency of the power source, into consideration. Therefore, if the intake air temperature and/or the atmospheric pressure change, the variation of the actual torque output from the power source is reduced.

In accordance with a fifth aspect of the present invention, in the control device of any one of the first to the fourth aspect, the first setting unit sets the first torque determined in accordance with a first value determined on the basis of an operation by a driver to indicate an output of the power source 1000 as well as the rotational speed of the output shaft of the power source; the second setting unit sets the second torque determined in accordance with the first value as well as the rotational speed of the output shaft of the power source; the control unit controls the power source 1000 to output a fourth torque determined in accordance with the third torque; and the control device further comprises a fourth setting unit that sets a second value indicating an output of the power source from the fourth torque determined in accordance with a rule set by the transmission ratio of the transmission, and a transmission control unit for controlling the transmission on the basis of the second value.

In the fifth aspect of the present invention, the first torque and the second torque are set in accordance with a first value determined on the basis of an operation by the driver to indicate the output of the power source, as well as the rotational speed of the output shaft of the power source. The third torque is set by combining the first and the second torque at a ratio determined in accordance with the gear ratio of the transmission. The power source is controlled to output a fourth torque set in accordance with the third torque. In such a vehicle, it is preferable that the output of the power source is recognized when the transmission connected to the power source is controlled, in order to control the hydraulic pressure used in the operation of the transmission or determine a transmission timing, for example. Accordingly, the second value indicating the output of the power source is determined from the fourth torque. The transmission is controlled on the basis of the second value. In this way, the transmission can be controlled on the basis of the output of the power source. However, it is preferable that the second value used to control the transmission is determined by manipulation of the driver in order to control the transmission depending on the manipulation of the driver. That is, the second value used to control the transmission corresponds to the first value determined on the basis of the manipulation of the driver. Meanwhile, the fourth torque used to determine the second value is set from the third torque obtained by combining the first and the second torque at the ratio determined in accordance with the transmission ratio of the transmission. The ratio of the first and the second torque combined is determined based on the transmission ratio of the transmission as well as the first value determined on the basis of the manipulation of the driver. Therefore, for example, even when the first values are different, the third torques set depending on the transmission ratio become approximately identical to each other, which may result in a same fourth torque. However, it is not easy to set different second values from the same fourth torque. Therefore, the second value is set in accordance with a rule, which is set in accordance with the transmission ratio of the transmission. Accordingly, even in the cases of the same fourth torque, different second values may be set if the transmission ratios of the transmission are different, so that it is possible to make the first value and the second value correspond to each other. The transmission is controlled on the basis of the second value. As a result, the transmission can be controlled by the manipulation of the driver.

In accordance with a sixth aspect of the present invention, in the control device of the fifth aspect, the transmission is a stepped automatic transmission and the fourth setting unit sets the second value from the fourth torque in accordance with a rule set by gear steps of the transmission.

In the sixth aspect of the present invention, the second value indicating the output from the fourth torque is set in accordance with the rule set by the gear steps of the transmission. Accordingly, in a vehicle including the stepped automatic transmission, it is possible to make the first and the second value correspond to each other with a high precision.

In accordance with a seventh aspect of the present invention, there is provided a control device for a vehicle including a power source and a transmission connected to the power source, the control device including: a torque setting unit that sets a target torque in accordance with a rotational speed of an output shaft of the power source (1000) and rules set by gear ratios of the transmission; and a control unit that controls the power source (1000) to output torque in accordance with the target torque.

In accordance with a eighth aspect of the present invention, there is provided a control method for a vehicle including a power source and a transmission connected to the power source. The control method includes: setting a first torque in accordance with a rotational speed of an output shaft of the power source; setting a second torque in accordance with the rotational speed of the output shaft of the power source in a different manner from the first torque; setting a third torque by combining the first torque and the second torque at a ratio depending on a gear ratio of the transmission; and controlling the power source to output torque in accordance with the third torque.

In accordance with a ninth aspect of the present invention, there is provided a control method for a vehicle including a power source and a transmission connected to the power source. The control method includes: setting a target torque in accordance with a rotational speed of an output shaft of the power source and rules set by gear ratios of the transmission; and controlling the power source to output torque in accordance with the target torque.

BRIEF DESCRIPTION OF THE DRAWINGS

The above and other objects and features of the present invention will become apparent from the following description of example embodiments, given in conjunction with the accompanying drawings, in which.

DETAILED DESCRIPTION OF THE EXAMPLE EMBODIMENTS

Figure 1:
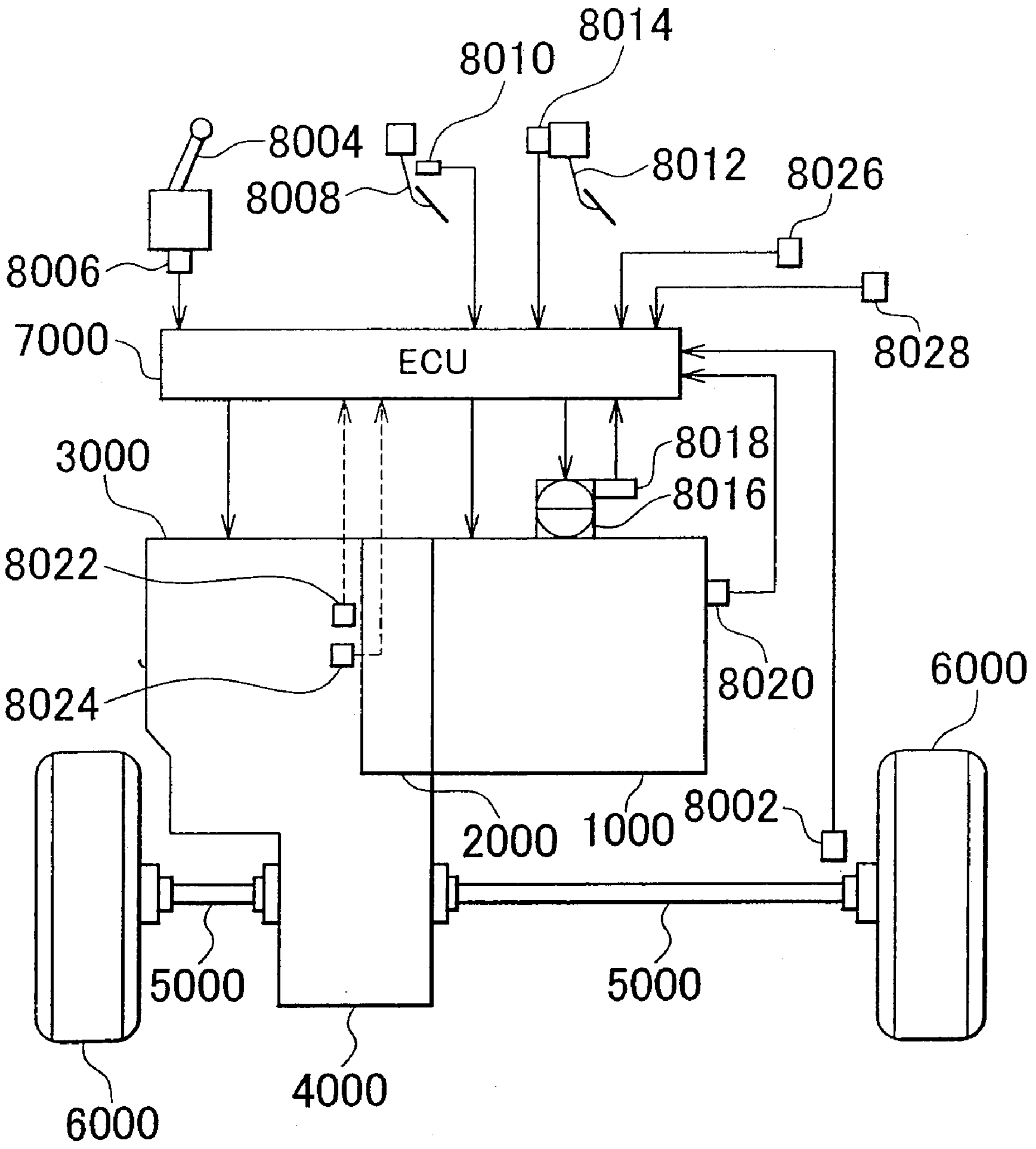
FIG. 1 is a schematic diagram showing a vehicle controlled by an ECU in accordance with a first embodiment of the present invention.

Hereinafter, example embodiments of the present invention will be described with reference to accompanying drawings. In the following description, like parts are represented by like reference numerals. The like parts have a same name and a same function, and redundant descriptions thereof will be omitted.

A vehicle including a control device in accordance with a first embodiment of the present invention will be described with reference to FIG. 1. In this embodiment, the vehicle is an FF (front engine-front drive) vehicle, but it may be an FR (front engine-rear drive) vehicle or the like.

The vehicle includes an engine 1000, a torque converter 2000, an automatic transmission 3000, a differential gear 4000, a drive shaft 5000, front wheels 6000, and an ECU (electronic control unit) 7000.

The engine 1000 is an internal combustion engine wherein a mixture of air and fuel injected from an injector (not shown) is combusted in a combustion chamber of a cylinder. A piston in the cylinder is pushed down by the combustion to rotate a crankshaft. The quantity of the fuel injected from the injector is determined based on the quantity of the air taken into the engine 1000 to be mixed with the fuel at a desired air/fuel ratio (for example, a stoichiometric ratio).

The automatic transmission 3000 is connected to the engine 1000 via a torque converter 2000. Therefore, the rotational speed of an output shaft of the torque converter 2000 (the rotational speed NT of a turbine) is equal to the rotational speed of an input shaft of the automatic transmission 3000.

The automatic transmission 3000 is a stepped automatic transmission having a planetary gear unit. The automatic transmission 3000 shifts gears to form a desired gear step, so that the rotational speed (rpm) of the crankshaft is transmitted to an output gear of the automatic transmission 3000 at a desired rotational speed. Alternatively, a CVT (continuously variable transmission), which steplessly changes the transmission ratio, may be employed instead of the stepped automatic transmission. Further, an automatic transmission that includes a constant mesh type gear mechanism in which the speed is changed by a hydraulic actuator may also be employed.

The output gear of the automatic transmission 3000 is meshed with the differential gear 4000. The differential gear 4000 is spline-connected to the drive shaft 5000, and the power is transferred to the right and left front wheels 6000 through the drive shaft 5000.

A vehicle speed sensor 8002, a position sensor 8006 of the shift lever 8004, an accelerator operation amount sensor 8010 of an accelerator pedal 8008, a stroke sensor 8014 of a brake pedal 8012, a throttle opening degree sensor 8018 of an electronic throttle valve 8016, an engine speed sensor 8020, an input shaft speed sensor 8022, an output shaft speed sensor 8024 are connected to the ECU 7000 via a harness or the like. Further, an intake air temperature sensor 8026 and an atmospheric pressure sensor 8028 are connected to the ECU 7000 via a harness or the like.

The vehicle speed sensor 8002 detects a speed of the vehicle based on the rotational speed of the drive shaft 5000 and transmits the detected vehicle speed to the ECU 7000. The position sensor 8006 detects the position of the shift lever 8004 and transmits a signal the detected shift lever position to the ECU 7000. A gear step of the automatic transmission 3000 is automatically set in accordance with the position of the shift lever 8004. Alternatively, a driver may arbitrarily set a gear step by in a manual shift mode.

The accelerator operation amount sensor 8010 detects the operation amount of the accelerator pedal 8008 and transmits the detected operation amount to the ECU 7000. The stroke sensor 8014 detects a stroke quantity of the brake pedal 8012 and transmits the detected stroke quantity to the ECU 7000.

The throttle opening degree sensor 8018 detects the opening degree of the electronic throttle valve 8016 (throttle opening degree), which is controlled by an actuator, and transmits the detected opening amount to the ECU 7000. An amount of air inducted into the engine 1000 (an output of the engine 1000) is controlled by the electronic throttle valve 8016. As the throttle opening degree increases, the amount of the air inducted into the engine 1000 is increased accordingly. That is, the throttle opening degree is used as an index representing the output of the engine 1000. Alternatively, the amount of the intake air may be controlled by the lift amount or an opening degree of an air intake valve (not shown) provided in the cylinder. In this case, the larger the lift amount or the opening degree is, the greater the amount of the intake air taken into the cylinder is.

The engine speed sensor 8020 detects the rotational speed (rpm) of the output shaft (crankshaft) of the engine 1000 (the engine speed NE) and transmits a signal that indicates the detected engine speed to the ECU 7000. The input shaft speed sensor 8022 detects the rotational speed of the input shaft NI of the automatic transmission 3000 (turbine rpm NT) and transmits a signal that indicates the detected input shaft speed to the ECU 7000. The output shaft rpm sensor 8024 detects the rpm of the output shaft NO of the automatic transmission 3000 and transmits a signal that indicates the detected output shaft speed to the ECU 7000.

The intake air temperature sensor 8026 detects the temperature of the intake air introduced into the engine 1000 (temperature of the intake air) and transmits a signal that indicates the detected intake air temperature to the ECU 7000. The atmospheric pressure sensor 8028 detects the atmospheric pressure and transmits the detected atmospheric pressure to the ECU 7000.

The ECU 7000 controls various devices of the vehicle to make the vehicle traveling state optimal on the basis of the signals transmitted from the respective sensors, a map stored in a ROM (read only memory) and a program.

In the present embodiment, the ECU 7000 controls the automatic transmission 3000 to set one of first to sixth gear steps when "D (drive)" is selected among shift ranges of the automatic transmission 3000 by putting the shift lever 8004 in "D (drive)". The automatic transmission 3000 can transfer power to the front wheels 6000 by setting one of the first to sixth gear steps. The gear step is set based on a speed change diagram, which has been prepared in advance by using the vehicle speed and the accelerator operation amount as parameters. Further, the number of gear steps is not limited to six and may be, e.g., seven or eight.

Figure 2:
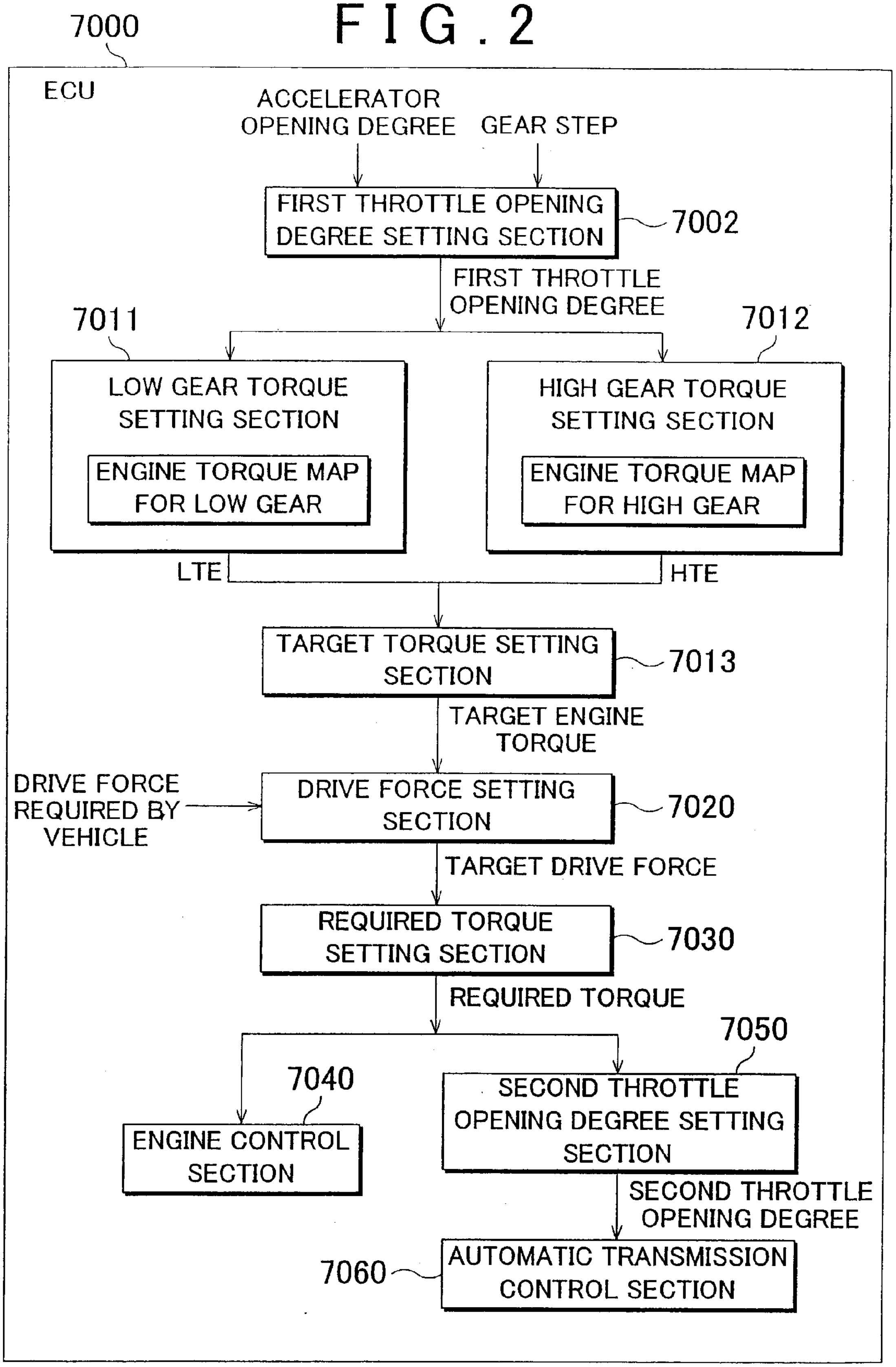
FIG. 2 shows the ECU as the control device in accordance with the first embodiment of the present invention.

With reference to FIG. 2, the ECU 7000 will be further described. The ECU 7000 includes a first throttle opening degree setting section 7002, a low gear torque setting section 7011, a high gear torque setting section 7012, a target torque setting section 7013, a drive force setting section 7020, a required torque setting section 7030, an engine control section 7040, a second throttle opening degree setting section 7050, and an automatic transmission control section 7060.

The first throttle opening degree setting section 7002 sets the first throttle opening degree based on a map having the accelerator operation amount and the gear steps as parameters. The first throttle opening degree is set to increase as the accelerator operation amount increases.

Figure 3:
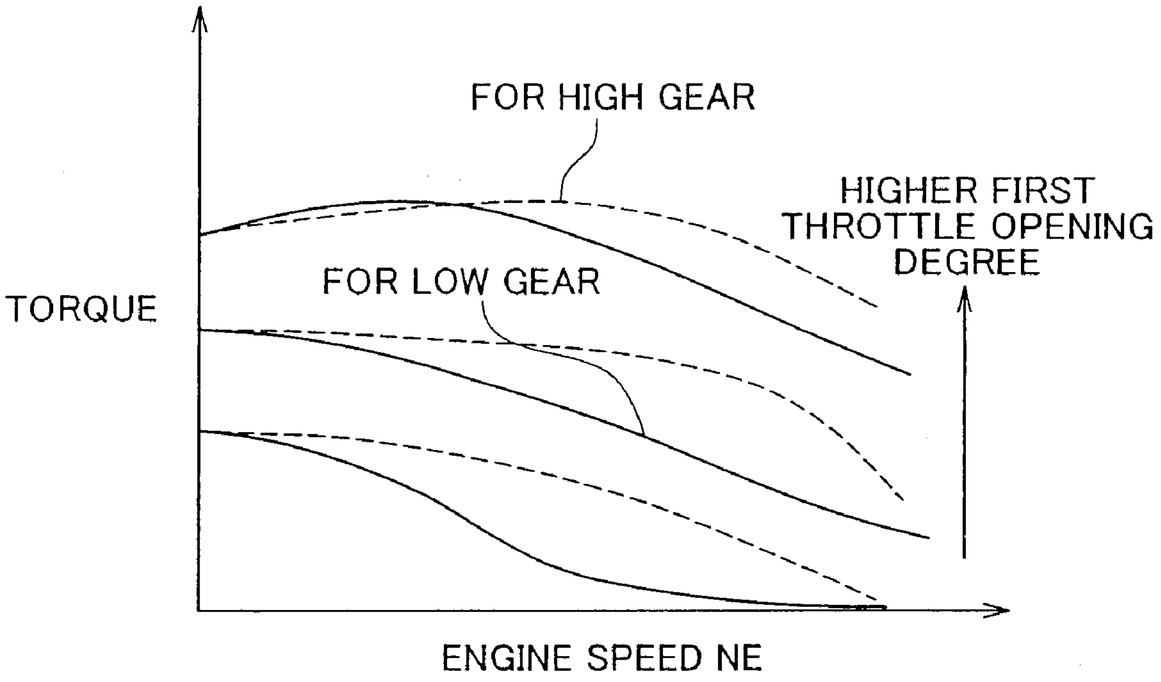
FIG. 3 is a graph for illustrating an engine torque map for low gear and an engine torque map for high gear.

The low gear torque setting section 7011 sets a low gear torque LTE based on an engine torque map for low gear having the first throttle opening degree and the engine rpm NE as parameters as indicated by solid lines in FIG. 3. The low gear torque LTE is set to increase as the first throttle opening degree increases.

The high gear torque setting section 7012 sets a high gear torque HTE based on an engine torque map for high gear having the first throttle opening degree and the engine speed NE as parameters as indicated by broken lines in FIG. 3. The high gear torque HTE is set to increase as the first throttle opening degree increases.

The high gear torque HTE is set different from the low gear torque LTE with respect to the variation of the engine speed NE. In this embodiment, the high gear torque HTE is set greater than the low gear torque LTE when the high engine speed NE is high under a certain first throttle opening degree.

Referring back to FIG. 2, the target torque setting section 7013 sets a target engine torque TTE by combining the low gear torque LTE and the high gear torque HTE at a ratio determined in accordance with a gear step. The process of setting the target engine torque TTE will be described in detail later.

The drive force setting section 7020 sets a target drive force obtained by integrating a drive force of the vehicle depending on the target engine torque TTE, i.e. a drive force requested from a driver and a drive force required by the vehicle due, for example, to a control for controlling the drive force of the vehicle to stabilize the behavior of the vehicle, such as a VSC (vehicle stability control) and/or a TRC (traction control).

The required torque setting section 7030 sets the torque required for the engine to realize the target drive force. The required torque is set by using the target drive force on the basis of the gear ratio, the radius of the vehicle wheel and the like.

The engine control section 7040 controls the engine 1000 to produce the required torque. The engine control section 7040 controls the engine 1000 by setting the throttle opening degree and an ignition timing to produce the required torque.

The second throttle opening degree setting section 7050 sets a second throttle opening degree used to control the automatic transmission 3000. The second throttle opening degree is not used to control the engine 1000.

The automatic transmission control section 7060 controls the automatic transmission 3000 by using the second throttle opening degree. The automatic transmission control section 7060 sets a line pressure and/or engagement pressures of a clutch and a brake by using the second throttle opening degree. For example, because a small second throttle opening degree indicates a low output torque of the engine 1000, the line pressure and/or the engagement pressures are reduced as the second throttle opening degree is decreases.

Hereinafter, the process of setting the target engine torque TTE by using the target torque setting section 7013 will be described. The target torque setting section 7013 sets the target engine torque TTE by combining the low gear torque LTE and the high gear torque HTE by using a correction ratio KGR.

The target engine torque TTE is set by the following equation:

$$TTE=LTE\cdot KGR+HTE\cdot(1-KGR) \qquad (1)$$

Figure 4:
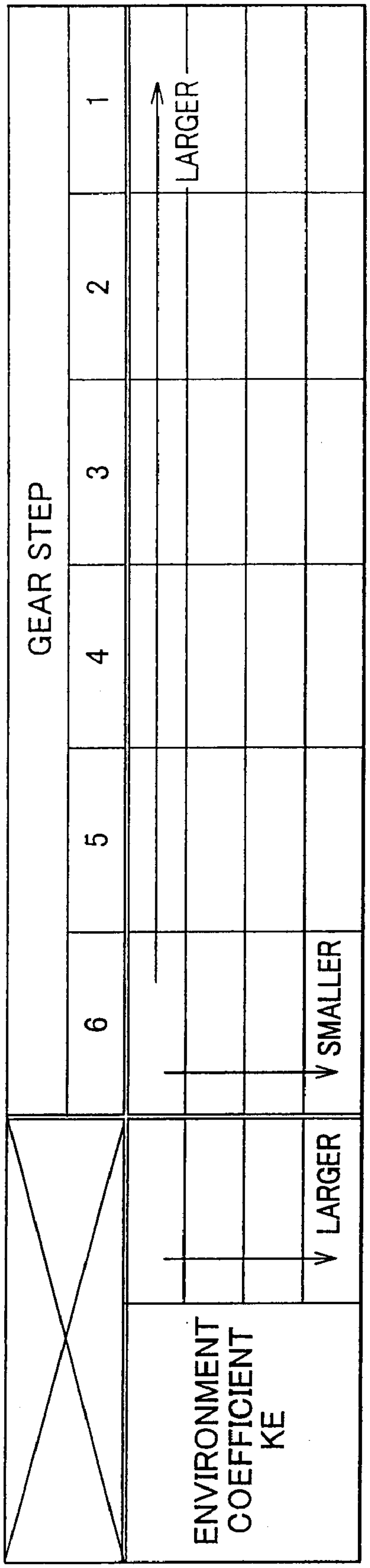
FIG. 4 sets forth a map wherein a correction ratio KGR is defined by using a gear step.

As shown in FIG. 4, the correction ratio KGR is set based on a map wherein the correction ratio KGR is defined by using the gear step or the gear ratio and an environment coefficient KE as parameters. In this embodiment, the correction ratio KGR is set to a value from 0 to 1.

The lower the gear step is, i.e., the larger the gear ratio is, the larger the correction ratio KGR is set. Further, the correction ratio KGR is set smaller as the environment coefficient KE is increased.

The environment coefficient KE is set by using an atmospheric pressure correction coefficient KPA and an intake air temperature correction coefficient KTHA by the following equation:

$$KE=KPA\cdot KTHA \qquad (2)$$

The method of setting the environment coefficient KE is not limited to the above. The atmospheric pressure correction coefficient KPA is set by using a ratio of a maximum output engine torque at a current atmospheric pressure PA and a maximum output engine torque at a reference atmospheric pressure PA. For example, when the maximum output engine torque at the current atmospheric pressure PA is smaller than the maximum output engine torque at the reference atmospheric pressure PA, as the difference therebetween increases, the atmospheric correction coefficient KPA is reduced. The method of setting the atmospheric pressure correction coefficient KPA is not limited to the above.

The intake air temperature correction coefficient KTHA is set by using a ratio of a maximum output engine torque at a current intake air temperature THA and a maximum output engine torque at a reference intake air temperature THA. For example, when the maximum output engine torque at the current intake air temperature THA is smaller than the maximum output engine torque at the reference intake air temperature THA, as the difference therebetween increases, the intake air correction coefficient KTHA is reduced. The method of setting the intake air temperature correction coefficient KTHA is not limited to the above.

Figure 5:
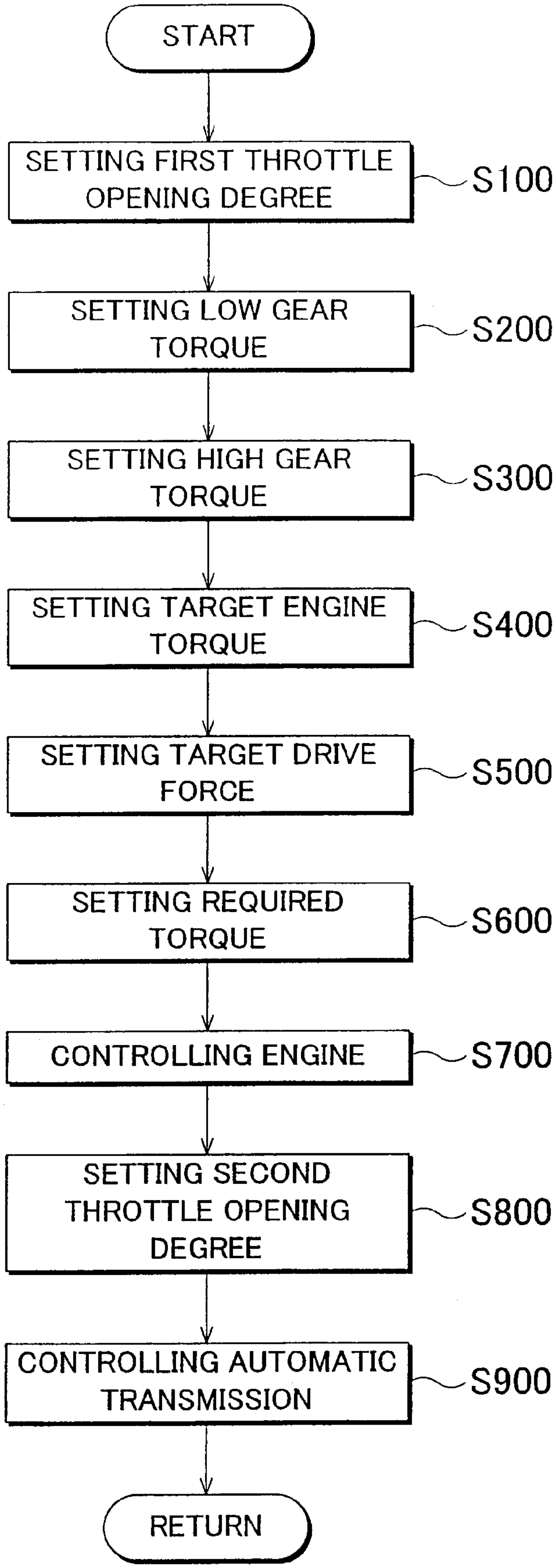
FIG. 5 is a flow chart representing a control sequence of a program executed by the ECU in accordance with the first embodiment of the present invention.

Referring to FIG. 5, a control sequence of a program executed by the ECU 7000 in accordance with this embodiment will be described.

In step S100, the ECU 7000 sets a first throttle opening degree based on the map having the accelerator operation amount and the gear steps as parameters.

In step S200, the ECU 7000 sets a low gear torque LTE based on the engine torque map for low gear having the first throttle opening degree and the engine speed NE as parameters.

In step S300, the ECU 7000 sets a high gear torque HTE based on the engine torque map for high gear having the first throttle opening degree and the engine speed NE as parameters.

In step S400, the ECU 7000 sets a target engine torque TTE by combining the low gear torque LTE and the high gear torque HTE by using the correction ratio KGR, determined on the basis of the gear step and the environment coefficient KE.

In step S500, the ECU 7000 sets a target drive force obtained by integrating the drive force of the vehicle depending on the target engine torque TTE and a drive force required by the vehicle. In step S600, the ECU 7000 sets a torque required for the engine 1000 to realize the target drive force. In step S700, the ECU 7000 controls the engine 1000 to produce the required torque.

In step S800, the ECU 7000 sets a second throttle opening degree used to control the automatic transmission 3000 on the basis of the required torque. In step S900, the ECU 7000 controls the automatic transmission 3000 on the basis of the second throttle opening degree.

Next, the operation of the ECU 7000 in accordance with this embodiment based on the sequence and the flow chart as described above will be described.

While the vehicle is traveling, a first throttle opening degree is set based on the map having the accelerator operation amount and the gear steps as parameters (S100). A low gear torque LTE is set based on the engine torque map for low gear having the first throttle opening degree and the engine speed NE as parameters (S200). Similarly, a high gear torque HTE is set based on the engine torque map for high gear having the first throttle opening degree and the engine speed NE as parameters (S300).

A target engine torque TTE is set by combining the low gear torque LTE and the high gear torque HTE by using a correction ratio KGR determined on the basis of the gear step and the environment coefficient KE (S400).

Here, the low gear torque LTE and the high gear torque HTE are those set based on the engine speed NE. The target engine torque TTE is set by using the low gear torque LTE and the high gear torque HTE. Accordingly, it is possible to obtain a target engine torque TTE that is varied depending on the engine speed NE.

The correction ratio KGR is determined based on factors influencing the output torque of the engine 1000 such as the atmospheric pressure PA and the intake air temperature THA. A target engine torque TTE is set by using the correction ratio KGR. In this way, it is possible to obtain a target engine torque TTE depending on the atmospheric pressure PA and the intake air temperature THA.

A target drive force is set by integrating the drive force of the vehicle depending on the target engine torque TTE and a drive force required by the vehicle (S500). A torque required for the engine 1000 to realize the target drive force is set (S600), and the engine 1000 is controlled to produce the required torque (S 700).

Accordingly, the torque output from the engine 1000 varies depending on the engine speed NE, so that it is possible to obtain a torque depending on the engine speed NE. As a result, the variation characteristics of the torque with respect to the change of the engine speed NE can be recognized more clearly.

Meanwhile, the second throttle opening degree used to control the automatic transmission 3000 is set on the basis of the required torque (S800). The automatic transmission 3000 is controlled in accordance with the second throttle opening degree (S900).

As mentioned above, in accordance with the present embodiment, the target engine torque TTE is set by combining the low gear torque LTE and the high gear torque HTE, which are set in accordance with the engine speed NE, by using the correction ratio KGR. The engine is controlled to produce the required torque set from the target engine torque TTE. Accordingly, the torque output from the engine varies according to the engine speed NE, so that it is possible to obtain a torque depending on the engine speed NE.

Figure 6:
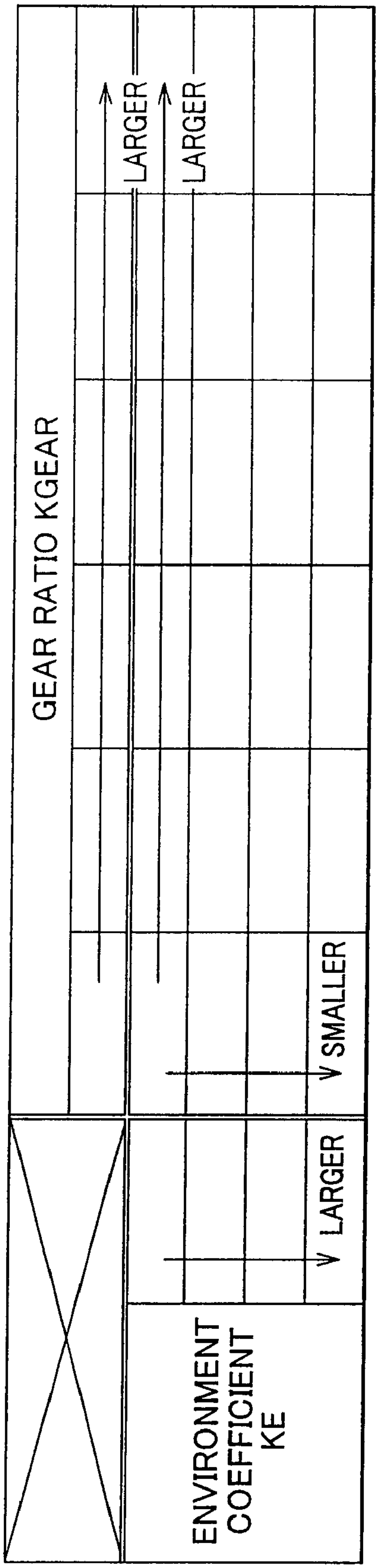
FIG. 6 shows another map wherein the correction ratio KGR is defined by a gear ratio.

Further, instead of the map in which the gear step is used as a parameter to define the correction ratio KGR, a map in which the gear ratio KGEAR itself is used as parameter to define the correction ratio KGR as shown in FIG. 6 may be used. The correction ratio KGR is increased as the gear ratio increases.

In this case, if the automatic transmission 3000 is shifting gears, the gear ratio KGEAR may be set by the following equation:

$$KGEAR = \text{gear ratio before gear shifting} + \text{degree of gear shifting} \cdot (\text{gear ratio after gear shifting} - \text{gear ratio before gear shifting}) \quad (3)$$

Where, the degree of gear shifting is a positive value equal to or less than 1. The degree of gear shifting is set based on a ratio of the current rotational NI of the input shaft of the automatic transmission 3000 and a predicted rotational speed NI (synchronous rpm) of the input shaft after gear shifting. If the automatic transmission 3000 is not shifting gears, the gear ratio KGEAR is that of the current gear step. The method of setting the degree of gear shifting is not limited to the above.

Further, although the first and the second throttle opening degrees are set in this embodiment, a value representing the output of the engine 1000 may be used instead of the first and the second throttle opening degrees.

Hereinafter, a second embodiment of the present invention will be described. The second embodiment differs from the first embodiment in that the second throttle opening degree is set from the required torque by using a conversion map determined for each gear step (conversion of the required torque to the second throttle opening degree). The configurations and functions of the other components of the second embodiment are the same as those of the first embodiment, and, therefore, redundant descriptions thereof will be omitted.

As described above, the automatic transmission 3000 is controlled by using the second throttle opening degree set from the required torque such that it is controlled in accordance with the output of the engine 1000. The automatic transmission 3000 may be further controlled by a manipulation of a driver in order to show an excellent drivability of the automatic transmission 3000.

Therefore, the second throttle opening degree preferably corresponds to the first throttle opening degree set based on the accelerator operation amount. For example, the second throttle opening degree should be approximately equal to the first throttle opening degree if there is no drive force required by the vehicle when the target drive force is set by the drive force setting section 7020. Further, if drive force is required by the vehicle when the target drive force is set by the drive force setting section 7020, the second throttle opening degree may be larger than the first throttle opening degree by a level corresponding to the drive force required by the vehicle.

Meanwhile, as mentioned above, the low gear torque LTE and the high gear torque HTE are set from the first throttle opening degree. The target engine torque TTE is set by combining the low gear torque LTE and the high gear torque HTE by using the correction ratio KGR determined depending on the gear step. The required torque is set based on the target engine torque TTE.

Accordingly, a same required torque may be set even in cases where the first throttle opening degrees are different. However, it is not easy to set different second throttle opening degrees from a same required torque.

Figure 7:
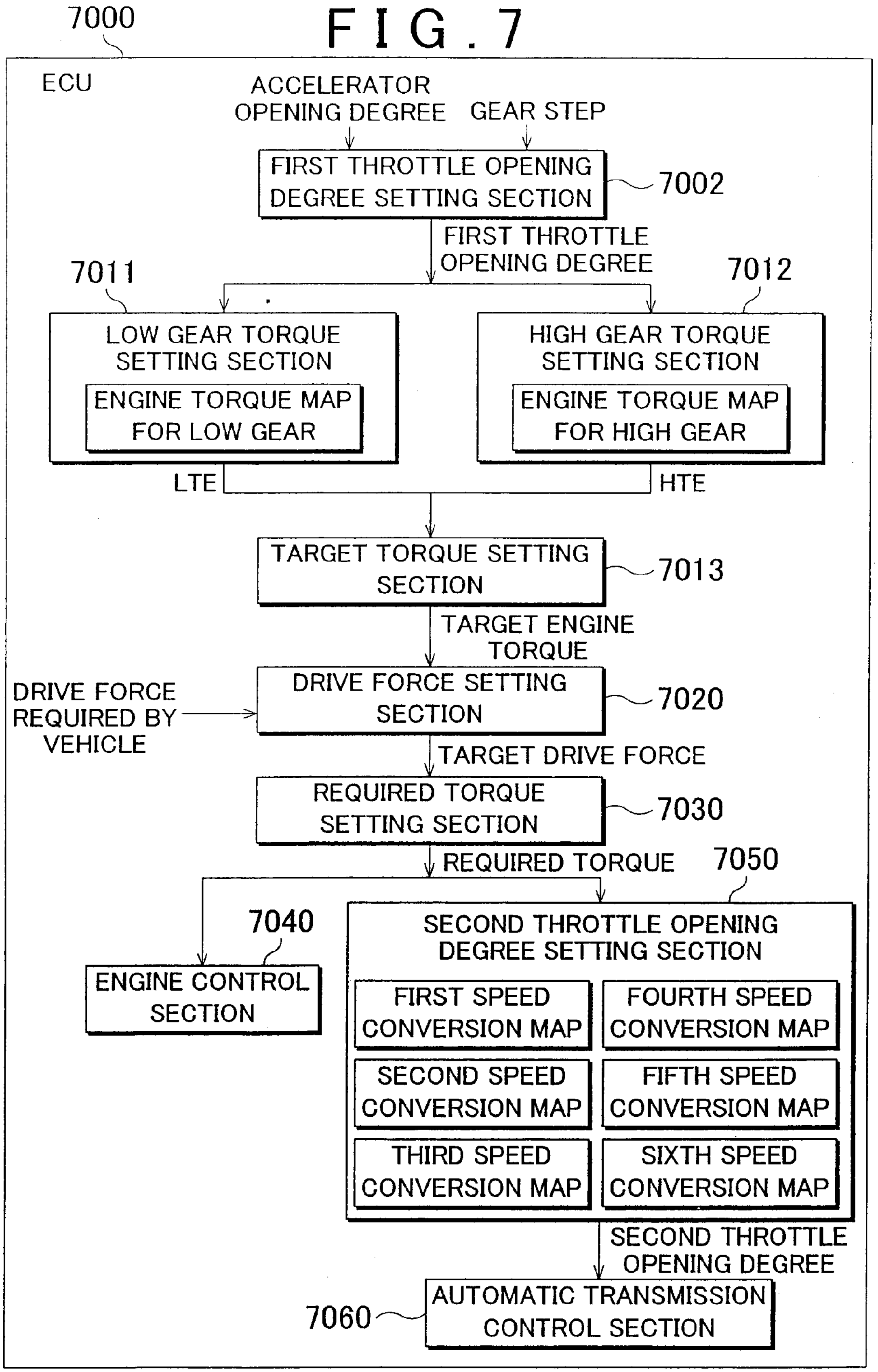
FIG. 7 depicts an ECU as a control device in accordance with a second embodiment of the present invention.

Therefore, in the second embodiment, as shown in FIG. 7, the second throttle opening degree setting section 7050 sets the second throttle opening degree in accordance with first to sixth speed conversion maps set for the respective gear steps. In each conversion map, the second throttle opening degree is determined to correspond to the required torque for the corresponding gear step. That is, each conversion map has a rule for setting the second throttle opening degree from the required torque.

The second throttle opening degree is set by using a conversion map corresponding to the gear step when the target engine torque TTE is set. For example, if the gear step when the target engine torque TTE is set is the first gear step, the throttle opening degree is set by using the first speed conversion map.

In this way, even if the required torque is same, different second throttle opening degrees may be set depending on the gear steps. Therefore, the second throttle opening degree may be made to precisely correspond to the first throttle opening degree.

Figure 8:
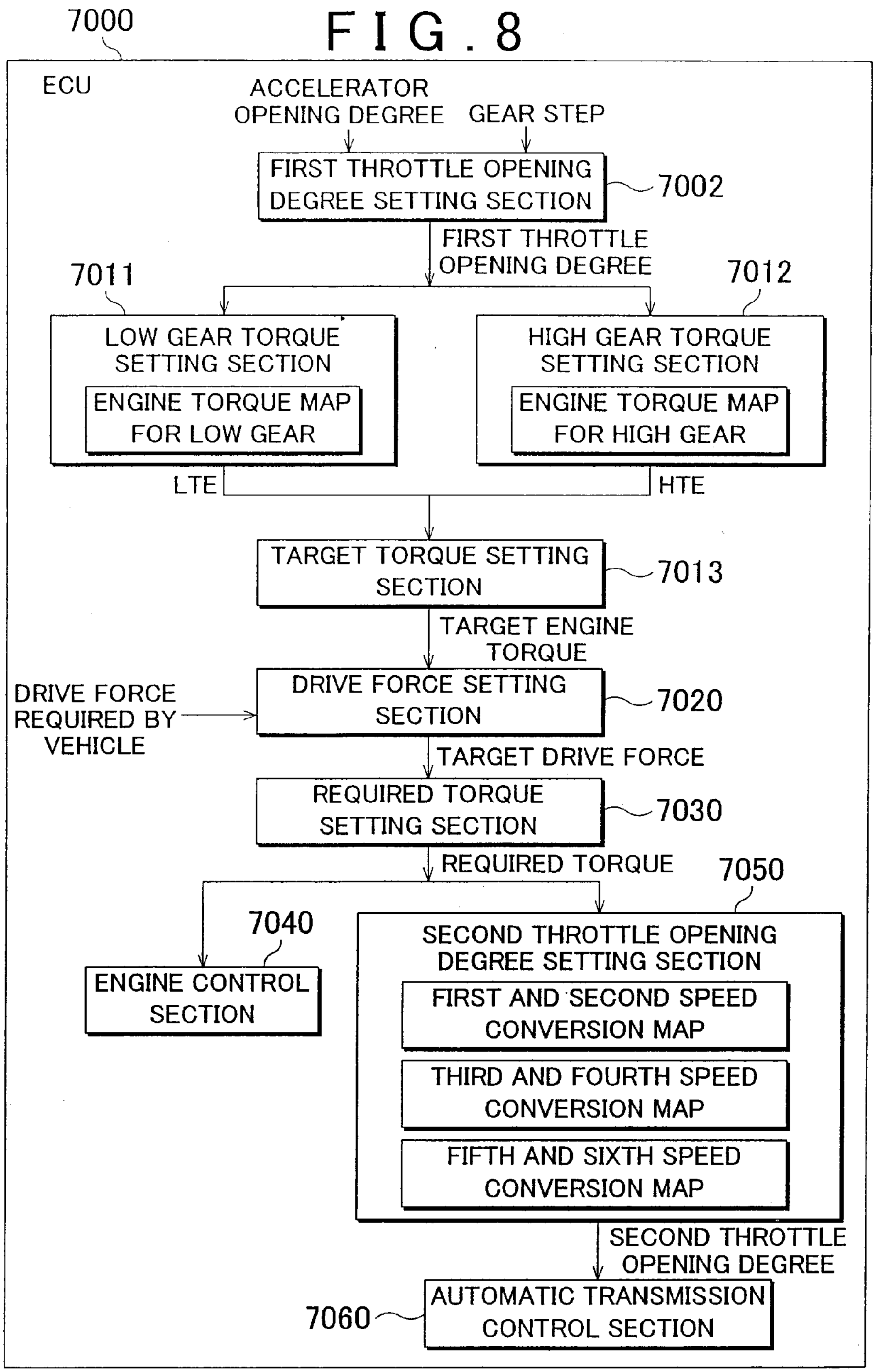
FIG. 8 illustrates a modification of the ECU as the control device in accordance with the second embodiment of the present invention.

Further, as shown in FIG. 8, instead of the above six conversion maps, a plurality of conversion maps each of which corresponds to a plurality of gear steps may be provided. FIG. 8 shows three conversion maps including one corresponding to the first and the second gear step, one corresponding to the third and the fourth gear step, and one corresponding to the fifth and the sixth gear step. The number of the conversion maps is not limited to three.

Further, the second throttle opening degree may be corrected by using the environment coefficient KE of the first embodiment. Further, the second throttle opening degree may be set by correcting the conversion maps by using the environment coefficient KE.

Hereinafter, a third embodiment of the present invention will be described. The third embodiment differs from the first and second embodiments in that the target engine torque is set from the first throttle opening degree by using a torque map determined for each gear step. The configurations and functions of the other components of the third embodiment are the same as those of the first embodiment, and, therefore, redundant descriptions thereof will be omitted.

Figure 9:
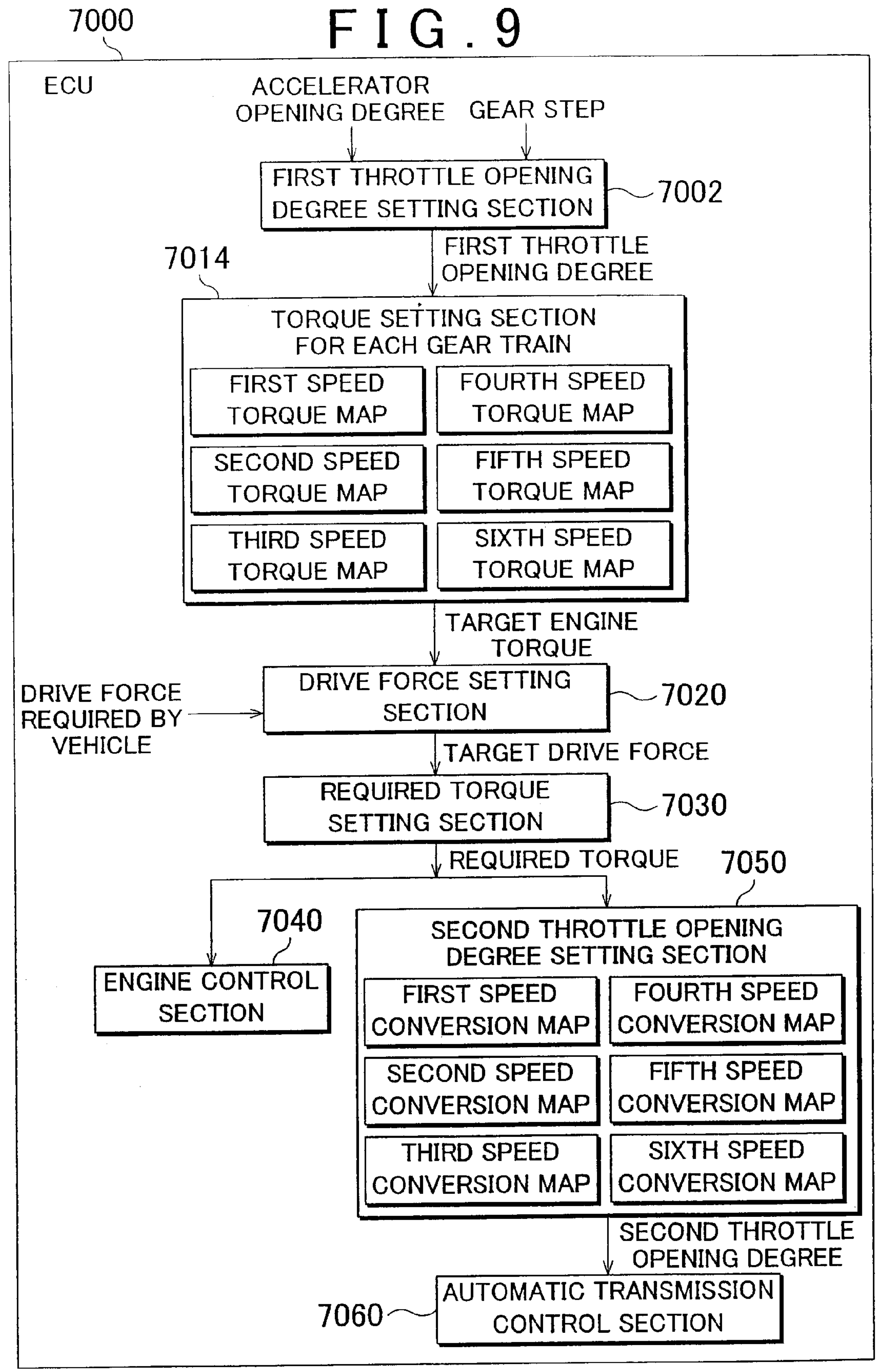
FIG. 9 represents an ECU as a control device in accordance with a third embodiment of the present invention.

As shown in FIG. 9, the ECU 7000 in the third embodiment includes a torque setting section for each gear train 7014, instead of the low gear torque setting section, the high gear torque setting section, and the target torque setting section of the first embodiment.

The torque setting section for each gear step 7014 sets the target engine torque TTE from the first throttle opening degree based on the first to sixth speed torque maps. In each torque map, the target engine torque TTE is determined to correspond to the first throttle opening degree in the corresponding gear step.

The throttle opening degree is set by using a torque map corresponding to the gear step at the time of setting the target engine torque TTE. For example, if the first gear step is set when setting the target engine torque TTE, the target engine torque TTE is set by using the first speed torque map. Therefore, the first throttle opening degree and the second throttle opening degree can be made to correspond to each other with a higher precision.

Figure 10:
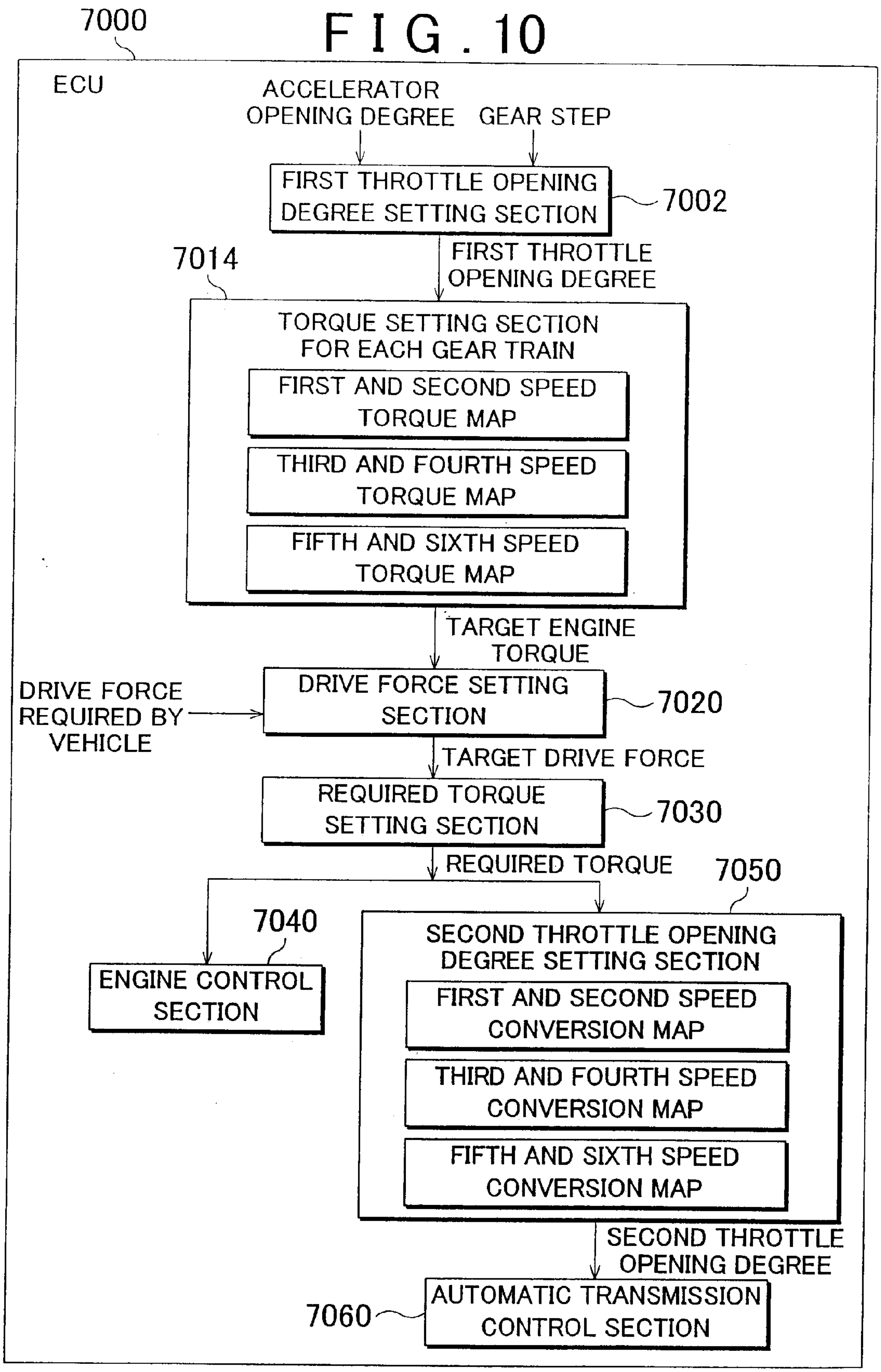
FIG. 10 shows a modification of the ECU as the control device in accordance with the third embodiment of the present invention.

Further, as shown in FIG. 10, instead of the six conversion maps and the six torque maps each of which correspond to a single gear step, a plurality of conversion maps and a plurality of torque maps each of which correspond to a plurality of gear steps may be provided. FIG. 10 shows three conversion maps including one corresponding to the first and the second gear step, one corresponding to the third and the fourth gear train, and one corresponding to the fifth and the sixth gear step. Further, FIG. 10 also shows three torque maps including one corresponding to the first and the second gear step, one corresponding to the third and fourth gear step, and one corresponding to the fifth and sixth gear step. However, the numbers of the conversion maps and the torque maps are not limited to three.

While the invention has been shown and described with respect to the example embodiments, it will be understood by those skilled in the art that various changes and modification may be made without departing from the scope of the invention as defined in the following claims.

The invention claimed is:

1. A control device for a vehicle including a power source and a transmission connected to the power source, the control device comprising:

a first setting unit that sets a first torque in accordance with first criteria that include a rotational speed of an output shaft of the power source a second setting unit that sets a second torque in accordance with second criteria that include the rotational speed of the output shaft of the power source;

a third setting unit that sets a third torque by combining the first torque and the second torque at a ratio depending on a gear ratio of the transmission; and a control unit that controls the power source to output torque in accordance with the third torque.

2. The control device according to claim 1, wherein the second setting unit sets the second torque to be greater than the first torque.

3. The control device according to claim 1, wherein the larger the gear ratio is, the larger the ratio for the first torque is which is set by the third setting unit.

4. The control device according to claim 1, the third setting unit sets the third torque by combining the first torque and the second torque at the ratio depending on a degree of gear shifting of the transmission in addition to the transmission ratio.

5. The control device according to claim 1, wherein the third setting unit sets the third torque by combining the first torque and the second torque at the ratio depending on a traveling environment of the vehicle in addition to the gear ratio of the transmission.

6. The control device according to claim 5, wherein the traveling environment of the vehicle is at least one of a temperature of an intake air into the power source and an atmospheric pressure.

7. The control device according to claim 1, wherein:

the first setting unit sets the first torque in accordance with a first value determined on the basis of an operation by a driver to indicate an output of the power source as well as the rotational speed of the output shaft of the power source; and the second setting unit sets the second torque in accordance with the first value as well as the rotational speed of the output shaft of the power source.

8. The control device according to claim 7, wherein the first value is determined based on an accelerator operation amount and the gear ratio of the transmission.

9. The control device according to claim 1, wherein the control unit controls the power source to output a fourth torque determined in accordance with at least one of a drive force requested from a driver and a drive force required by the vehicle in addition to the third torque.

10. The control device according to claim 9, further comprising:

a fourth setting unit that sets a second value indicating an output of the power source based on the fourth torque in accordance with a rule set by the transmission ratio of the transmission; and a transmission control unit that controls the transmission on the basis of the second value.

11. The control device according to claim 10, wherein the transmission is a stepped automatic transmission, and the fourth setting unit sets the second value based on the fourth torque in accordance with rules set by gear steps of the transmission.

12. The control device according to claim 11, wherein the fourth setting unit sets the second value in accordance with rules each of which is set by each gear step of the transmission.

13. The control device according to claim 11, wherein the fourth setting unit sets the second value in accordance with rules each of which is set by a plurality of gear steps of the transmission.

14. The control device according to claim 11, wherein the fourth setting unit sets the second value in accordance with a traveling environment of the vehicle in addition to the transmission ratio.

15. The control device according to claim 1, wherein the smaller the gear ratio is, the larger the ratio for the second torque is which is set by the third setting unit.

16. A control method for a vehicle including a power source and a transmission connected to the power source, the control method comprising:

setting a first torque in accordance with first criteria that include a rotational speed of an output shaft of the power source;

setting a second torque in accordance with second criteria that include the rotational speed of the output shaft of the power source;

setting a third torque by combining the first torque and the second torque at a ratio depending on a gear ratio of the transmission; and controlling the power source to output torque in accordance with the third torque.

17. The control method according to claim 16, wherein the smaller the gear ratio is, the larger the ratio for the second torque is while setting the third torque.

18. A control device for a vehicle including a power source and a transmission connected to the power source, the control device comprising:

first setting means for setting a first torque in accordance with first criteria that include a rotational speed of an output shaft of the power source;

second setting means for setting a second torque in accordance with second criteria that include the rotational speed of the output shaft of the power source;

third setting means for setting a third torque by combining the first torque and the second torque at a ratio depending on a gear ratio of the transmission; and control means for controlling the power source to output torque in accordance with the third torque.

19. The control device according to claim 18, wherein the smaller the gear ratio is, the larger the ratio for the second torque is which is set by the third setting means.

* * * * *